US009236641B2

(12) United States Patent
Shishikura

(10) Patent No.: US 9,236,641 B2
(45) Date of Patent: Jan. 12, 2016

(54) AIR BATTERY CATALYST AND AIR BATTERY USING THE SAME

(75) Inventor: Toshikazu Shishikura, Chiba (JP)

(73) Assignee: SHOWA DENKO K.K., Tokyo (JP)

( * ) Notice: Subject to any disclaimer, the term of this patent is extended or adjusted under 35 U.S.C. 154(b) by 1056 days.

(21) Appl. No.: 13/257,218

(22) PCT Filed: Mar. 16, 2010

(86) PCT No.: PCT/JP2010/054442
§ 371 (c)(1),
(2), (4) Date: Sep. 16, 2011

(87) PCT Pub. No.: WO2010/107028
PCT Pub. Date: Sep. 23, 2010

(65) Prior Publication Data
US 2012/0003548 A1  Jan. 5, 2012

(30) Foreign Application Priority Data

Mar. 18, 2009  (JP) ................. 2009-065383

(51) Int. Cl.
*H01M 4/90* (2006.01)
*H01M 12/08* (2006.01)

(52) U.S. Cl.
CPC ........... *H01M 12/08* (2013.01); *H01M 4/90* (2013.01); *Y02E 60/50* (2013.01)

(58) Field of Classification Search
CPC ....................................................... H01M 4/90
USPC ......................................................... 429/405
See application file for complete search history.

(56) References Cited

U.S. PATENT DOCUMENTS

| | | | |
|---|---|---|---|
| 3,492,100 A | 1/1970 | Roubin et al. | |
| 3,899,357 A * | 8/1975 | Rinaldi et al. | 429/528 |
| 7,887,957 B2 | 2/2011 | Shiga et al. | |
| 8,496,903 B2 * | 7/2013 | Monden et al. | 423/365 |
| 8,642,495 B2 * | 2/2014 | Monden et al. | 502/174 |
| 2007/0128884 A1 | 6/2007 | Ota et al. | |
| 2007/0259267 A1 | 11/2007 | Ota et al. | |
| 2010/0227253 A1 | 9/2010 | Monden et al. | |

(Continued)

FOREIGN PATENT DOCUMENTS

| | | |
|---|---|---|
| JP | 02-257577 A | 10/1990 |
| JP | 2003-12375 A | 1/2003 |

(Continued)

OTHER PUBLICATIONS

English Translation of JP 2003-012375.*

(Continued)

*Primary Examiner* — Ula C Ruddock
*Assistant Examiner* — Frank Chernow
(74) *Attorney, Agent, or Firm* — Sughrue Mion, PLLC

(57) ABSTRACT

Catalysts are provided which can catalyze both the oxygen reduction during the discharge of a secondary air battery and the oxygen production in the recharging of the battery and which are stable at a high potential in the recharging. The invention has been accomplished based on the finding that a catalyst including an oxycarbonitride of a specific transition metal selected from, for example, titanium, zirconium, hafnium, vanadium, niobium and tantalum can catalyze both the oxygen reduction during the discharge of a secondary air battery and the oxygen production in the recharging of the battery and is also stable at a high potential in the recharging.

3 Claims, 11 Drawing Sheets

(56) References Cited

U.S. PATENT DOCUMENTS

| | | |
|---|---|---|
| 2011/0008709 A1 | 1/2011 | Shishikura et al. |
| 2011/0020729 A1* | 1/2011 | Monden et al. ............... 429/483 |
| 2011/0053040 A1 | 3/2011 | Monden et al. |

FOREIGN PATENT DOCUMENTS

| | | |
|---|---|---|
| JP | 2003-200051 A | 7/2003 |
| JP | 2004-076084 A | 3/2004 |
| JP | 2005-161203 A | 6/2005 |
| JP | 2008-112724 A | 5/2008 |
| JP | 2008-270166 A | 11/2008 |
| JP | 2008-300273 A | 12/2008 |
| WO | 2006/019128 A1 | 2/2006 |
| WO | WO-2009119523 A1 * | 1/2009 ............. H01M 4/90 |
| WO | 2009/031383 A1 | 3/2009 |
| WO | 2009/091043 A1 | 7/2009 |
| WO | 2009/107518 A1 | 9/2009 |

OTHER PUBLICATIONS

Arai, H., "Shigen-to-Sozai", Journal of the Mining and Materials Processing Institute of Japan, 2001, vol. 11, No. 3, pp. 177-182.

Onoe et al., "Development of Method for Forming Carbon Electrode for Air Battery", Chemical Engineering, Sep. 1990, vol. 35, No. 9, pp. 23-30.

Y. Ohgi, et al., "Catalytic activity of partially-oxidized transition metal carbonitrides for oxygen reduction reaction", The Electrochemical Society of Japan Dai 74 Kai Taikai Koen Yoshishu, Mar. 29, 2007, p. 94.

* cited by examiner

AIR BATTERY CATALYST AND AIR BATTERY USING THE SAME

CROSS REFERENCE TO RELATED APPLICATIONS

This application is a National Stage of International Application No. PCT/JP2010/054442 filed Mar. 16, 2010, claiming priority based on Japanese Patent Application No. 2009-065383 filed Mar. 18, 2009.

TECHNICAL FIELD

The present invention relates to air battery catalysts and air batteries using the catalysts.

BACKGROUND ART

Air batteries generally utilize air as a cathode reactant and have an anode that is composed of a material providing a potential difference from the air cathode, for example Li, Li alloy or Li-intercalated carbon, and a hydrogen storage alloy that has absorbed hydrogen. Other possible anodes are metals that give divalent ions such as Zn, Mg and Ca, those giving trivalent ions such as Al, and alloys of these metals.

With atmospheric air as the cathode reactant, the air batteries achieve a very high energy density. Thus, they are very attractive as next-generation batteries and metal fuel cells.

During discharge, the metal ions flow from the anode and react with the cathode air (oxygen), forming the metal oxide. In the recharging, the metal oxide is reduced to the metal ions and air.

Appropriate catalysts are necessary in order that the oxygen reduction takes place efficiently during the discharge and that oxygen is produced efficiently from the metal oxide during the recharging. Current catalysts used for this purpose include electrolytic manganese dioxide, porphyrin complexes, polymeric cobalt phthalocyanine and platinum as described in Non-Patent Literature 1. However, as mentioned in Non-Patent Literature 2, electrolytic manganese dioxide and porphyrin complexes are labile to oxidation, and the platinum group metals are soluble in solvents, although very slowly, and the dissolved species precipitate on the anode and can induce a side reaction.

Further, various metal compounds are disclosed as air battery catalysts in JP-A-H02-257577, JP-A-2003-200051, JP-A-2004-076084, JP-A-2008-112724, JP-A-2008-270166 and JP-A-2008-300273.

CITATION LIST

Non-Patent Literatures

Non-Patent Literature 1: Chemical Engineering, September issue, pp. 23-30, 1990
Non-Patent Literature 2: Hajime ARAI, Shigen to Sozai (Resources and Materials), Vol. 117, No. 3, pp. 177-182, 2001

SUMMARY OF INVENTION

Technical Problem

However, those metal compounds are insufficient in oxygen reduction properties, oxygen production properties or durability under the use conditions.

In the case of secondary air batteries, electrolytic manganese dioxide and porphyrin complexes are incapable of sufficiently catalyzing the reaction and the reverse reaction and are not sufficiently stable at a high potential at the recharging.

Thus, the existing catalysts do not sufficiently meet the requirements.

The present invention is aimed at solving the problems in the art as described above. It is therefore an object of the invention to provide catalysts which can efficiently catalyze the oxygen reduction during the discharge of an air battery and can also catalyze efficiently the oxygen production in the recharging of a secondary air battery and which are stable at a high potential in the recharging.

Solution to Problem

The present inventors carried out studies to solve the problems in the art described hereinabove. They have then found that a catalyst composed of an oxycarbonitride of a specific transition metal can catalyze both the oxygen reduction during the discharge of an air battery and the oxygen production in the recharging of a secondary air battery and is also stable at a high potential in the recharging. The invention has been completed based on the finding.

For example, the present invention is concerned with the following (1) to (11).

(1) An air battery catalyst comprising an oxycarbonitride of a Group IV transition metal and/or a Group V transition metal.

(2) The air battery catalyst described in (1), wherein at least one selected from the group consisting of other transition metals, Group XIII and Group XIV metals, rare earth metals and alkaline earth metals has been added to the metal oxycarbonitride.

(3) The air battery catalyst described in (1) or (2), wherein the Group IV transition metal and/or the Group V transition metal is at least one metal selected from the group consisting of titanium, zirconium and niobium.

(4) The air battery catalyst described in (2) or (3), wherein the at least one selected from the group consisting of other transition metals, Group XIII and Group XIV metals, rare earth metals and alkaline earth metals is at least one metal selected from the group consisting of tin, indium, platinum, copper, iron, chromium, molybdenum, tungsten, hafnium, cobalt, manganese, cerium, nickel, yttrium, lanthanum, samarium, calcium, barium and magnesium.

(5) The air battery catalyst described in (3), wherein the metal oxycarbonitride has a compositional formula represented by $NbC_xN_yO_z$ (wherein x, y and z represent a ratio of the numbers of the atoms, $0.02 \leq x \leq 1.2$, $0.01 \leq y \leq 0.7$, $0.4 \leq z \leq 2.5$, and $1 \leq x+y+z \leq 3.9$).

(6) The air battery catalyst described in (4), wherein the metal oxycarbonitride has a compositional formula represented by $Nb_aM_bC_xN_yO_z$ (wherein a, b, x, y and z represent a ratio of the numbers of the atoms, $0.01 \leq a < 1$, $0 < b \leq 0.99$, $a+b=1$, $0.02 \leq x \leq 1.2$, $0.01 \leq y \leq 0.7$, $0.4 \leq z \leq 2.5$, and $1 \leq x+y+z \leq 3.9$, and M is at least one metal selected from the group consisting of tin, indium, platinum, copper, iron, chromium, molybdenum, tungsten, hafnium, cobalt, manganese, cerium, nickel, yttrium, lanthanum, samarium, calcium, barium and magnesium).

(7) The air battery catalyst described in (3), wherein the metal oxycarbonitride has a compositional formula represented by $TiC_xN_yO_z$ (wherein x, y and z represent a ratio of the numbers of the atoms, $0.05 \leq x \leq 1.2$, $0.01 \leq y \leq 0.7$, $0.1 \leq z \leq 1.94$, $1.0 \leq x+y+z \leq 3.1$, and $2.0 \leq 4x+3y+2z$).

(8) The air battery catalyst described in (4), wherein the metal oxycarbonitride has a compositional formula represented by $Ti_aM_bC_xN_yO_z$ (wherein a, b, x, y and z represent a ratio of the numbers of the atoms, $0.01 \le a < 1.0$, $0 < b \le 0.99$, $a+b=1$, $0.05 \le x \le 1.2$, $0.01 \le y \le 0.7$, $0.1 \le z \le 1.94$, $1.0 \le x+y+z \le 3.1$, and $2.0 \le 4x+3y+2z$, and M is at least one metal selected from the group consisting of tin, indium, platinum, copper, iron, chromium, molybdenum, tungsten, hafnium, cobalt, manganese, cerium, nickel, yttrium, lanthanum, samarium, calcium, barium and magnesium).

(9) The air battery catalyst described in (7) or (8), wherein the titanium-containing oxycarbonitride has a crystal structure that contains a rutile crystal structure according to X-ray powder diffractometry (Cu-Kα radiation).

(10) The air battery catalyst described in any one of (1) to (9), wherein the air battery catalyst is used in combination with an air battery anode comprising lithium, aluminum, magnesium, calcium, zinc, an alloy of any of these metals with another metal, or any of these metals that is intercalated in carbon.

(11) A secondary air battery comprising the catalyst described in any one of (1) to (10).

Advantageous Effects of Invention

The catalysts according to the invention can catalyze both the oxygen reduction during the discharge of a primary or secondary air battery and the oxygen production in the recharging of a secondary air battery and are also stable at a high potential in the recharging. Accordingly, the air batteries having the catalysts achieve good discharge characteristics. Further, since the catalysts have high reversibility, the air batteries of the invention can be used as secondary batteries having a high energy density.

BRIEF DESCRIPTION OF DRAWINGS

FIG. 14-2 shows data in nitrogen in Comparative Example 1.

FIG. 17-1 is a current-potential curve of an electrode (an air electrode of Example 7) in Example 9.

FIG. 17-2 is a current-potential curve of an electrode (a platinum plate) in Example 9.

FIG. 17-3 is a current-potential curve of an electrode (an air electrode of Comparative Example 1) in Example 9.

DESCRIPTION OF EMBODIMENTS

Catalysts

Figure 1:
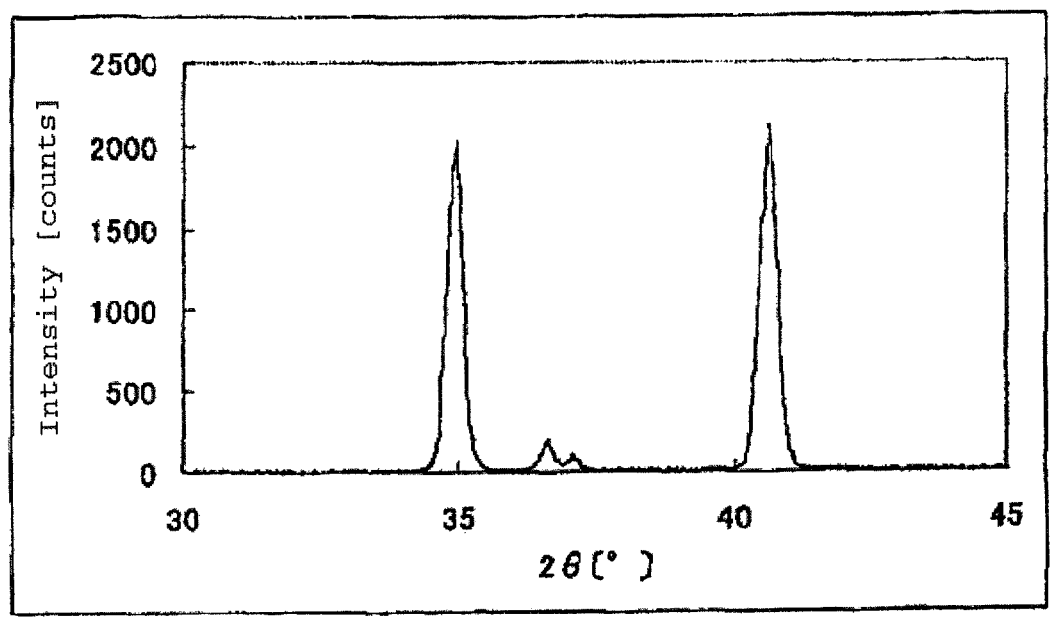
FIG. 1 is an X-ray powder diffraction spectrum of NbCN in Example 1.

A catalyst according to the invention is formed of an oxycarbonitride of a Group IV transition metal and/or a Group V transition metal in the periodic table, or is formed of an oxycarbonitride of a Group IV transition metal and/or a Group V transition metal with the further addition of at least one selected from other transition metals, Group XIII and Group XIV metals, rare earth metals and alkaline earth metals.

In detail, the Group IV transition metals include titanium, zirconium and hafnium, and the Group V transition metals include vanadium, niobium and tantalum.

Examples of the other transition metals, the Group XIII and Group XIV metals, the rare earth metals and/or the alkaline earth metals include tin, indium, platinum, copper, iron, chromium, molybdenum, tungsten, hafnium, cobalt, manganese, nickel, yttrium, lanthanum, cerium, samarium, calcium, barium and magnesium.

Of these, titanium is the most preferred Group IV transition metal, and niobium is the most preferred Group V transition metal.

Tin and iron are preferable among the other transition metals, the Group XIII and Group XIV metals, the rare earth metals and/or the alkaline earth metals. In particular, when the transition metal is niobium, tin or iron is preferably used in combination therewith.

When the Group V transition metal is niobium, the metal oxycarbonitride preferably has a compositional formula represented by:

$$NbC_xN_yO_z \quad (1)$$

(wherein x, y and z represent a ratio of the numbers of the atoms, $0.02 \le x \le 1.2$ (preferably $0.02 \le x \le 0.7$, and more preferably $0.05 \le x \le 0.7$), $0.01 \le y \le 0.7$, $0.4 \le z \le 2.5$, and $1 \le x+y+z \le 3.9$).

In Formula (1) above, x, y and z are preferably $0.02 \le x \le 0.5$, $0.01 \le y \le 0.5$ and $1.5 \le z \le 2.5$, and more preferably $0.10 \le x \le 0.5$, $0.02 \le y \le 0.1$ and $2.0 \le z \le 2.5$. When $0.02 \le x \le 0.5$, $0.01 \le y \le 0.5$ and $1.5 \le z \le 2.5$, it is desirable that $1.7 \le x+y+z \le 3.5$. When $0.10 \le x \le 0.5$, $0.02 \le y \le 0.1$ and $2.0 \le z \le 2.5$, it is desirable that $2.2 \le x+y+z \le 2.9$. When the elements have the above ratio, the obtainable catalyst does not dissolve in an electrolyte and can lower the overvoltage for the oxygen production and the oxygen reduction.

When the catalyst further contains a metal selected from other transition metals, Group XIII and Group XIV metals, rare earth metals and/or alkaline earth metals, the metal oxycarbonitride preferably has a compositional formula represented by:

$$Nb_aM_bC_xN_yO_z \quad (2)$$

(wherein a, b, x, y and z represent a ratio of the numbers of the atoms, $0.01 \leq a < 1$, $0 < b \leq 0.99$, $a+b=1$, $0.02 \leq x \leq 1.2$ (preferably $0.02 \leq x \leq 0.7$, and more preferably $0.05 \leq x \leq 0.7$), $0.01 \leq y \leq 0.7$, $0.4 \leq z \leq 2.5$, and $1 \leq x+y+z \leq 3.9$, and M is at least one metal selected from tin, indium, platinum, copper, iron, chromium, molybdenum, tungsten, hafnium, cobalt, manganese, cerium, nickel, yttrium, lanthanum, samarium, calcium, barium and magnesium).

In Formula (2) above, x, y and z are preferably $0.02 \leq x \leq 0.5$, $0.01 \leq y \leq 0.5$ and $1.5 \leq z \leq 2.5$, and more preferably $0.10 \leq x \leq 0.5$, $0.02 \leq y \leq 0.1$ and $2.0 \leq z \leq 2.5$. When $0.02 \leq x \leq 0.5$, $0.01 \leq y \leq 0.5$ and $1.5 \leq z \leq 2.5$, it is desirable that $1.7 \leq x+y+z \leq 3.5$. When $0.10 \leq x \leq 0.5$, $0.02 \leq y \leq 0.1$ and $2.0 \leq z \leq 2.5$, it is desirable that $2.2 \leq x+y+z \leq 2.9$.

When niobium is used as the Group V transition metal, the metal oxycarbonitride preferably shows two or more diffraction peaks at diffraction angles 2θ of 33° to 43° as measured by X-ray powder diffractometry (Cu—Kα radiation). High activity is obtained when the crystal structure has a $Nb_{12}O_{29}$ composition in a major proportion.

The diffraction peak is a peak that is observed at a specific diffraction angle and a specific diffraction intensity when a sample (crystal) is irradiated with X-rays at various angles. In the invention, a signal that is detected with a signal (S) to noise (N) ratio (S/N) of 2 or more is regarded as a diffraction peak. Here, the noise (N) is the width of the baseline.

In the composition of NbCNO, it is considered important that niobium has an oxide structure, not the rock salt structure NbCN. Two or more diffraction peaks observed at diffraction angles 2θ of 33° to 43° indicate that the structure has changed from the rock salt structure to an oxide structure. Compounds based on the rock salt structure are considered to exhibit substantially no catalytic activity.

The X-ray diffractometer may be X-ray powder diffractometer Rigaku RAD-RX. The measurement conditions may be X-ray output (Cu—Kα): 50 kV, 180 mA; scan axis: θ/2θ; measurement angles (2θ): 10° to 89.98°; measurement mode: FT; scanning width: 0.02°; sampling time: 0.70 sec; DS, SS and RS: 0.5°, 0.5° and 0.15 mm; and goniometer radius: 185 mm.

When the Group IV transition metal is titanium, the metal oxycarbonitride preferably has a compositional formula represented by:

$$TiC_xN_yO_z \quad (3)$$

(wherein x, y and z represent a ratio of the numbers of the atoms, $0.05 \leq x \leq 1.2$ (preferably $0.05 \leq x \leq 0.7$), $0.01 \leq y \leq 0.7$, $0.1 \leq z \leq 1.94$, $1.0 \leq x+y+z \leq 3.1$ (preferably $1.0 \leq x+y+z \leq 2.0$), and $2.0 \leq 4x+3y+2z$, and preferably $0.05 \leq x \leq 0.7$, $0.01 \leq y \leq 0.7$, $0.1 \leq z \leq 1.94$, $1.0 \leq x+y+z \leq 2.0$, and $2.0 \leq 4x+3y+2z$).

In Formula (3) above, x, y and z are preferably $0.05 \leq x \leq 0.5$, $0.01 \leq y \leq 0.50$ and $0.1 \leq z \leq 1.90$, and more preferably $0.08 \leq x \leq 0.4$, $0.03 \leq y \leq 0.30$ and $1.4 \leq z \leq 1.85$. When $0.05 \leq x \leq 0.5$, $0.01 \leq y \leq 0.50$ and $0.1 \leq z \leq 1.90$, it is desirable that $1.2 \leq x+y+z \leq 3.0$ and $2.5 \leq 4x+3y+2z$. When $0.08 \leq x \leq 0.4$, $0.03 \leq y \leq 0.30$ and $1.4 \leq z \leq 1.85$, it is desirable that $1.8 \leq x+y+z \leq 2.5$ and $3.5 \leq 4x+3y+2z$. When the elements have the above ratio, the obtainable catalyst does not dissolve in an electrolyte and lowers the overvoltage for the oxygen production and the oxygen reduction.

When the catalyst further contains a metal selected from other transition metals, Group XIII and Group XIV metals, rare earth metals and/or alkaline earth metals, the metal oxycarbonitride preferably has a compositional formula represented by:

$$Ti_aM_bC_xN_yO_z \quad (4)$$

(wherein a, b, x, y and z represent a ratio of the numbers of the atoms, $0.01 \leq a < 1.0$, $0 < b \leq 0.99$, $a+b=1$, $0.05 \leq x \leq 1.2$ (preferably $0.05 \leq x \leq 0.7$), $0.01 \leq y \leq 0.7$, $0.1 \leq z \leq 1.94$, $1.0 \leq x+y+z \leq 3.1$ (preferably $1.0 \leq x+y+z \leq 2.0$), and $2.0 \leq 4x+3y+2z$, and preferably $0.05 \leq x \leq 0.7$, $0.01 \leq y \leq 0.7$, $0.1 \leq z \leq 1.94$, $1.0 \leq x+y+z \leq 2.0$, and $2.0 \leq 4x+3y+2z$, and M is at least one metal selected from tin, indium, platinum, copper, iron, chromium, molybdenum, tungsten, hafnium, cobalt, manganese, cerium, nickel, yttrium, lanthanum, samarium, calcium, barium and magnesium).

In Formula (4) above, x, y and z are preferably $0.05 \leq x \leq 0.5$, $0.01 \leq y \leq 0.50$ and $0.1 \leq z \leq 1.90$, and more preferably $0.08 \leq x \leq 0.4$, $0.03 \leq y \leq 0.30$ and $1.4 \leq z \leq 1.85$. When $0.05 \leq x \leq 0.5$, $0.01 \leq y \leq 0.50$ and $0.1 \leq z \leq 1.90$, it is desirable that $1.2 \leq x+y+z \leq 3.0$ and $2.5 \leq 4x+3y+2z$. When $0.08 \leq x \leq 0.4$, $0.03 \leq y \leq 0.30$ and $1.4 \leq z \leq 1.85$, it is desirable that $1.8 \leq x+y+z \leq 2.5$ and $3.5 \leq 4x+3y+2z$.

When titanium is used as the Group IV transition metal, it is preferable that titanium mainly has a rutile crystal structure according to X-ray powder diffractometry (Cu—Kα radiation). In other words, the crystal structure of the metal oxycarbonitride according to X-ray powder diffractometry (Cu—Kα radiation) preferably includes a rutile crystal structure.

In the invention, the metal oxycarbonitride indicates a compound represented by a compositional formula $M'C_xN_yO_z$; a mixture which contains compounds such as a metal M' oxide, a metal M' carbide, a metal M' nitride, a metal M' carbonitride, a metal M' oxycarbide and a metal M' oxynitride and which is represented as a whole by a compositional formula $M'C_xN_yO_z$; or a mixture which contains a compound represented by $M'C_xN_yO_z$ and a compound(s) such as a metal M' oxide, a metal M' carbide, a metal M' nitride, a metal M' carbonitride, a metal M' oxycarbide or a metal M' oxynitride and which is represented as a whole by a compositional formula $M' C_xN_yO_z$. Herein, the metal M' indicates the Group IV transition metal and/or the Group V transition metal. When the metal oxycarbonitride contains a metal selected from other transition metals, Group XIII and Group XIV metals, rare earth metals and/or alkaline earth metals, the metal M' collectively indicates the Group IV transition metal and/or the Group V transition metal, and the metal(s) selected from other transition metals, Group XIII and Group XIV metals, rare earth metals and/or alkaline earth metals.

The catalyst in the invention is most reliably evaluated by testing an air battery incorporated with the catalyst.

For the evaluation of an air electrode used in zinc-air batteries, the catalyst may be evaluated by procedures in which an air electrode is prepared by dropping an aqueous suspension of a mixture of the catalyst and carbon black onto one end surface of a carbon rod followed by drying and covering the surface with a porous tetrafluoroethylene resin layer, and the air electrode is evaluated by potential scanning in an alkaline solution using platinum or graphite as the counter electrode and a hydrogen electrode as the reference electrode.

Alternatively, an air electrode that is constituted by a collector supporting the catalyst is contacted with an oxide as an anode reactant, and the air electrode is evaluated by determining the efficiency in the production of oxygen from the oxide or the air reduction at the air electrode using a collector/electrode that is composed of platinum impregnated with an electrolyte as the counter electrode and silver/silver chloride as the reference electrode.

Still alternatively, the evaluation may be made with respect to a simple air battery cell.

In detail, a metal such as Li is used as the anode and a platinum mesh supporting the catalyst is used as the air electrode, they are assembled with an electrolyte-impregnated separator therebetween, and the assemble is interposed between tetrafluoroethylene resin frames such that air can flow in and out through the backside of the platinum mesh, resulting in a secondary air battery which is evaluated with respect to the reversibility.

<Catalyst Production Processes>

The catalysts described above may be produced by any processes without limitation. For example, a carbonitride containing titanium or niobium may be heat treated in an inert gas containing oxygen to give a titanium or niobium oxycarbonitride catalyst.

Alternatively, the process may include a step in which a metal carbonitride containing titanium or niobium and at least one metal M selected from tin, indium, platinum, copper, iron, chromium, molybdenum, tungsten, hafnium, cobalt, manganese, cerium, nickel, yttrium, lanthanum, samarium, calcium, barium and magnesium, may be heat treated in an inert gas containing oxygen to give a metal oxycarbonitride that contains titanium or niobium and at least one metal M selected from tin, indium, platinum, copper, iron, chromium, molybdenum, tungsten, hafnium, cobalt, manganese, cerium, nickel, yttrium, lanthanum, samarium, calcium, barium and magnesium.

When other metals such as rare earth metals and alkaline earth metals are added, they may be added as metals or compounds such as oxides and may be calcined thereafter to obtain the desired composition.

The metal carbonitride used in the production process may be obtained by a method (I) in which a mixture of the metal oxide and carbon is heat treated in a nitrogen atmosphere to give the metal carbonitride, a method (II) in which a mixture of the metal oxide and the metal nitride is heat treated in, for example, a nitrogen atmosphere to give the metal carbonitride, a method (III) in which a mixture of the metal oxide, the metal carbide and the metal nitride is heat treated in, for example, a nitrogen atmosphere to give the metal carbonitride, or a method (IV) in which a mixture of a compound containing the metal (for example, organic acid salt, chloride, carbide, nitride or complex), the metal carbide and the metal nitride is heat treated in, for example, a nitrogen atmosphere to give the metal carbonitride.

The above methods (I) to (IV) may be adopted when two or more metals are involved. For example, niobium iron carbonitride may be produced by heat treating a mixture of niobium oxide and iron oxide together with carbon in a nitrogen atmosphere (the method (I)), or by heat treating a mixture of iron oxide and niobium nitride in a nitrogen atmosphere (the method (II)).

Alternatively, niobium carbide and niobium nitride may be mixed with iron oxide and the mixture may be heat treated in a nitrogen atmosphere (the method (III)).

Still alternatively, niobium iron carbonitride may be obtained by mixing an organic acid iron with niobium carbide and niobium nitride and heat treating the mixture in a nitrogen atmosphere. Titanium cerium carbonitride may be produced by the similar procedures.

In the production of the metal carbonitride, the heat treatment temperature is in the range of 600° C. to 1800° C., and preferably 800° C. to 1600° C. This heat treatment temperature provides good crystallinity and homogeneity. The heat treatment at temperatures below 600° C. tends to result in deteriorated crystallinity and homogeneity. Heating at temperatures above 1800° C. tends to result in easy sintering.

Examples of the metal M oxides as materials include tin oxide, indium oxide, platinum oxide, tantalum oxide, zirconium oxide, copper oxide, iron oxide, tungsten oxide, chromium oxide, molybdenum oxide, hafnium oxide, titanium oxide, vanadium oxide, cobalt oxide, manganese oxide, cerium oxide and nickel oxide. One or more metal M oxides may be used.

Examples of the niobium oxides as materials include NbO, $NbO_2$ and $Nb_2O_5$.

The titanium oxide $TiO_2$ may be generally used. However, the titanium oxides are not limited thereto, and titanium oxides having other valences may be used.

Examples of the carbons as materials include carbon, carbon blacks, graphites, black leads, activated carbons, carbon nanotubes, carbon nanofibers, carbon nanohorns and fullerenes. The carbons preferably have smaller particle diameters. Such carbon particles have a larger specific surface area and react easily with the oxides.

For example, carbon black (specific surface area: 100-300 $m^2/g$, for example XC-72 manufactured by Cabot Corporation) may be suitably used.

The above materials may be used in any combinations without limitation. That is, a mixture of any niobium oxide or titanium oxide with any metal M oxide, and any carbon can be heat treated to give a metal carbonitride, and heat treating the metal carbonitride in an oxygen-containing inert gas can produce a metal oxycarbonitride catalyst which has high activity and can catalyze very efficiently the oxygen reduction at an air electrode in a secondary air battery and the oxygen production in the recharging of the secondary air battery.

For the production of an oxycarbonitride catalyst containing the other metal(s), for example an oxycarbonitride of niobium and other metal, an appropriate metal carbonitride may be prepared by controlling the amounts (the molar ratio) of the other metal oxide, the niobium oxide and the carbon.

The amounts (the molar ratio) are usually such that the metal M oxide and the carbon are used at 0.01 to 10 mol and 1 to 10 mol, respectively, based on 1 mol of the niobium oxide, and preferably such that the metal M oxide and the carbon are used at 0.01 to 4 mol and 2 to 6 mol, respectively, based on 1 mol of the niobium oxide. This molar ratio results in a metal carbonitride which can give a secondary air battery catalyst having a very high activity.

(Step for Producing Metal Oxycarbonitride)

Next, there will be described a step of obtaining the metal oxycarbonitride by heat treating the metal carbonitride from any of the methods (I) to (IV) in an oxygen-containing inert gas.

Examples of the inert gases include nitrogen gas, helium gas, neon gas, argon gas, krypton gas, xenon gas and radon gas. Nitrogen gas and argon gas are particularly preferred because of relatively easy availability.

The oxygen concentration in this step depends on the heat treatment time and the heat treatment temperature, but is preferably in the range of 0.1 to 10% by volume, and particularly preferably 0.5 to 5% by volume. This oxygen concentration ensures that a homogeneous oxycarbonitride is formed. If the oxygen concentration is below 0.1% by volume, the oxidation tends to fail. If the concentration is in excess of 10% by volume, the oxidation tends to proceed excessively.

In order that the reaction takes place homogeneously throughout the carbonitride, a small amount of hydrogen gas may be added in the oxidation reaction, thereby allowing for extremely efficient synthesis of the catalyst having high activity. The concentration of the hydrogen gas is preferably not more than 10 mol %, and more preferably not more than 5 mol % of the total atmosphere gas in consideration of reactivity and safety.

In this step, the heat treatment temperature is usually in the range of 400 to 1400° C., and preferably 600 to 1200° C. This heat treatment ensures that a homogeneous metal oxycarbonitride is formed. If the heat treatment temperature is below 400° C., the oxidation tends not to proceed. Heating at temperatures above 1400° C. tends to result in excessive oxidation and crystal growth.

The heat treatment in this step may be performed by, for example, a standing method, a stirring method, a dropping method or a powder capturing method.

In the dropping method, an induction furnace is brought to a predetermined heat treatment temperature while flowing an inert gas containing a trace amount of oxygen through the furnace; a thermal equilibrium is maintained at the temperature and the metal carbonitride is dropped and heated in a crucible which is the heating zone in the furnace. The dropping methods provide advantages that the aggregation and growth of particles of the metal carbonitride are minimized.

In the powder capturing method, the metal carbonitride is caused to suspend as particles in an inert gas atmosphere containing a trace amount of oxygen, and the metal carbonitride is captured and heated in a vertical tubular furnace controlled at a predetermined heat treatment temperature.

In the dropping method, the heat treatment time for the metal carbonitride is usually from 0.5 to 10 minutes, and preferably from 0.5 to 3 minutes. This heat treatment time tends to ensure that a homogeneous metal oxycarbonitride is formed. The heat treatment for less than 0.5 minutes tends to result in partial oxidation of the metal carbonitride. If the heat treatment time exceeds 10 minutes, the oxidation tends to proceed excessively.

In the powder capturing method, the heat treatment time for the metal carbonitride is from 0.2 seconds to 1 minute, and preferably from 0.2 to 10 seconds. This heat treatment time tends to ensure that a homogeneous metal oxycarbonitride is formed. The heat treatment for less than 0.2 seconds tends to result in partial oxidation of the metal carbonitride. If the heat treatment time exceeds 1 minute, the oxidation tends to proceed excessively. When the heat treatment is performed in a tubular furnace, the heat treatment time for the metal carbonitride is from 0.1 to 10 hours, and preferably from 0.5 to 5 hours. This heat treatment time tends to ensure that a homogeneous metal oxycarbonitride is formed. The heat treatment for less than 0.1 hours tends to result in partial oxidation of the metal carbonitride. If the heat treatment time exceeds 10 hours, the oxidation tends to proceed excessively.

In the invention, the metal oxycarbonitrides obtained by the aforementioned processes may be used directly as the catalysts according to the invention. In another embodiment, the metal oxycarbonitride may be crushed into finer particles.

The methods for crushing the metal oxycarbonitrides include roll milling, ball milling, medium stirring milling, and crushing with an air flow crusher, a mortar or a crushing tank. To crush the metal oxycarbonitrides into finer particles, an air flow crusher is preferably used. To facilitate the crushing in small amounts, the use of a mortar is preferable.

<Uses>

The catalysts according to the invention may be used as air battery catalysts.

The catalysts of the invention have high oxygen reduction ability as well as low overvoltage for the oxygen production in recharging. Thus, the catalysts are suited for use in secondary metal air batteries. Air batteries utilize air as a cathode reactant and have an anode that is composed of a material providing a potential difference from the air cathode, for example Li, Li alloy or Li-intercalated carbon, and a hydrogen storage alloy that has absorbed hydrogen. Other possible anodes are metals that give divalent ions such as Zn, Mg and Ca, those giving trivalent ions such as Al, and alloys of these metals.

With atmospheric air as the cathode reactant, the air batteries achieve a very high energy density and are very attractive as next-generation batteries. In particular, zinc-air batteries employ an aqueous electrolyte solution and are therefore suited for the application of the invention. Further, a high battery voltage is obtained by constituting the anode with an alkali metal such as Li or such an alkali metal intercalated in carbon or the like.

During discharge, the metal ions flow from the anode and react with air (oxygen) at the cathode, forming the metal oxide. In the case of a secondary battery, the metal oxide is reduced to the metal ions and air in the recharging. The catalysts of the invention can efficiently catalyze the oxygen reduction during the discharge and the oxygen production from the metal oxide in the recharging.

In a preferred embodiment, a layer formed of the catalyst according to the invention further contains electron conductive particles. When the catalyst layer contains electron conductive particles, the catalytic reaction current may be further increased probably because the electron conductive particles establish electrical contact points in the catalyst for inducing the electrochemical reaction.

The electron conductive particles are generally used as a carrier for the catalyst.

Examples of the electron conductive particles include carbons, conductive polymers, conductive ceramics, metals and conductive inorganic oxides such as tungsten oxide and iridium oxide. These materials may be used singly or in combination with one another. In particular, since carbon has a large specific surface area, it is preferable to use single carbon or a mixture of carbon and other electron conductive particles. That is, the air battery catalyst layer according to a preferred embodiment contains the catalyst and carbon.

Examples of the carbons include carbon blacks, graphites, black leads, activated carbons, carbon nanotubes, carbon nanofibers, carbon nanohorns and fullerenes. If the particle diameter of carbon is excessively small, it tends to be difficult for the carbon to form an electron conductive path. If the particle diameter is excessively large, the air battery catalyst layer tends to reduce gas diffusion properties or the catalyst usage rate tends to be lowered. The carbon particle diameter is thus preferably in the range of 10 to 1000 nm, and more preferably 10 to 100 nm.

When the electron conductive particles are carbon, the mass ratio of the catalyst and the carbon (catalyst:electron conductive particles) is preferably in the range of 4:1 to 1000:1.

The conductive polymers are not particularly limited. Examples thereof include polyacetylene, poly-p-phenylene, polyaniline, polyalkylaniline, polypyrrole, polythiophene, polyindole, poly-1,5-diaminoanthraquinone, polyaminodiphenyl, poly(o-phenylenediamine), poly(quinolinium) salt, polypyridine, polyquinoxaline and polyphenylquinoxaline. Of these, polypyrrole, polyaniline and polythiophene are preferred, and polypyrrole is more preferred.

The catalyst may be dispersed on the electron conductive particles as the carrier by methods such as airborne dispersion methods and in-liquid dispersion methods.

The in-liquid dispersion methods are preferable because the dispersion of the catalyst and the electron conductive particles in a solvent may be used in the step of producing the fuel cell catalyst layers. Exemplary in-liquid dispersion methods include an orifice-choked flow method, a rotational shear flow method and an ultrasonic method. The solvents used in the in-liquid dispersion methods are not particularly limited as long as the catalysts or the electron conductive particles are not corroded and are dispersed therein. Volatile liquid organic solvents and water are generally used.

When the catalyst is dispersed on the electron conductive particles, an electrolyte and a dispersant may be dispersed together.

The air battery catalyst layer may be formed by any methods without limitation. For example, a suspension containing the catalyst, the electron conductive particles and a binder may be applied to a collector, a separator or a solid electrolyte. The application methods include dipping, screen printing, roll coating and spraying. In another embodiment, a suspension containing the catalyst, the electron conductive particles and an electrolyte may be applied or filtered onto a substrate to form a catalyst layer, and the catalyst layer may be transferred to a separator or a solid electrolyte.

The present invention will be described in detail by presenting examples hereinbelow without limiting the scope of the invention.

EXAMPLES

In Examples and Comparative Examples, measurements were carried out by the following methods.
[Analytical Methods]
1. X-Ray Powder Diffractometry Samples were analyzed by X-ray powder diffractometry using Rotaflex manufactured by Rigaku Corporation.

In the X-ray powder diffractometry of each sample, the diffraction peaks were counted in a manner such that a signal which was detected with a signal (S) to noise (N) ratio (S/N) of 2 or more was regarded as a diffraction peak. The noise (N) was the width of the baseline.
2. Elemental Analysis Carbon: Approximately 0.1 g of a sample was weighed out and analyzed with EMIA-110 manufactured by HORIBA, Ltd.

Nitrogen and oxygen: Approximately 0.1 g of a sample sealed in a Ni cup was analyzed with an ON analyzer.

Niobium and other metals M: Approximately 0.1 g of a sample was weighed on a platinum dish, and an acid was added thereto. The sample was then thermally decomposed. The thermal decomposition product was collected to a predetermined volume, diluted and analyzed by ICP-MS.
3. BET Specific Surface Area The BET specific surface area of the catalyst was measured using Micromeritics Gemini 2360 manufactured by Shimadzu Corporation.

Example 1

1. Preparation of Catalyst

Niobium (IV) oxide ($NbO_2$) weighing 2.50 g (20 mmol) and 600 mg (50 mmol) of carbon (Vulcan 72 manufactured by Cabot Corporation) were sufficiently crushed and mixed together. The resultant powder mixture was heated in a tubular furnace in a nitrogen atmosphere at 1600° C. for 1 hour to give 2.54 g of niobium carbonitride.

FIG. 1 shows an X-ray powder diffraction spectrum of the niobium carbonitride.

The niobium carbonitride in an amount of 1.00 g was heated in a tubular furnace at 800° C. for 1 hour while passing an argon gas containing 1% by volume of oxygen gas. As a result, 1.08 g of niobium oxycarbonitride (hereinafter, also referred to as the catalyst (1)) was obtained.

Figure 2:
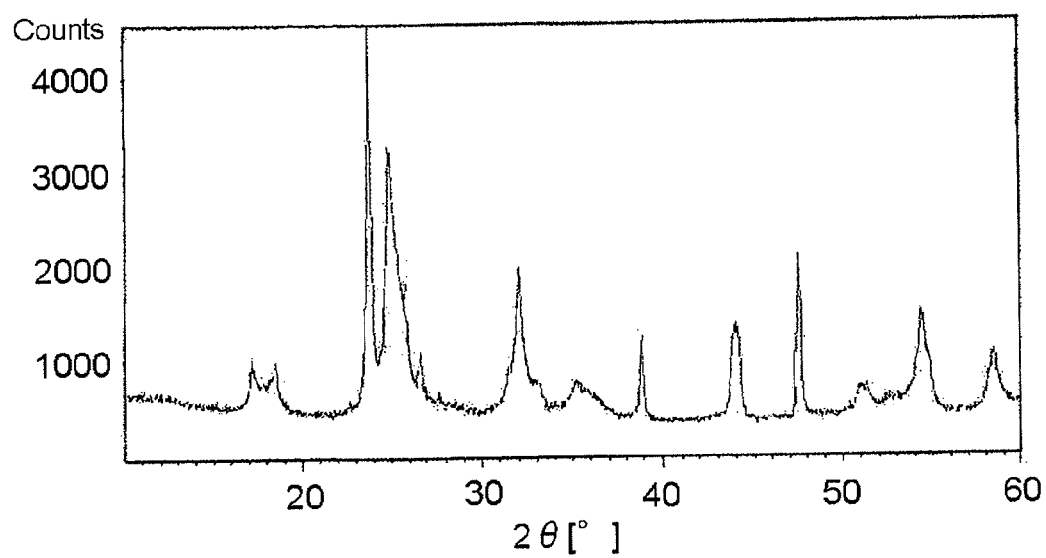
FIG. 2 is an X-ray powder diffraction spectrum of a NbCNO catalyst in Example 1.

FIG. 2 shows an X-ray powder diffraction spectrum of the catalyst (1). The spectrum was in agreement with that of $Nb_{12}O_{29}$. The BET specific surface area of the catalyst (1) was 2.2 $m^2/g$.

The elemental analysis of the catalyst provided the following molar ratio.

Nb:C:N:O=1:0.35:0.1:2.20

2. Production of Secondary Air Battery Sample

The catalytic performance was evaluated as follows. The catalyst (1) in an amount of 0.095 g and carbon (XC-72 manufactured by Cabot Corporation) weighing 0.005 g were added to 10 g of a solution consisting of isopropyl alcohol: pure water=2:1 by mass. The mixture was ultrasonically stirred to give a suspended mixture. The mixture was pressure molded into a compact 10 mm in diameter and was placed in the center of a platinum mesh collector 14.5 mm in diameter.

The counter electrode, i.e., the anode was composed of a Ni collector 14.5 mm in diameter on which a 10 mm diameter Li metal was pressure bonded in the center. The cathode collector and the anode collector were coated with an insulating resin to avoid direct contact with an electrolyte except the areas that were in contact with the catalyst and the electrode.

The electrolyte was a solution of degassed and dried 1M $LiPF_6$ in a 1:1:1 (by mass) solvent mixture of ethylene carbonate, ethyl carbonate and dimethyl carbonate.

Figure 3:
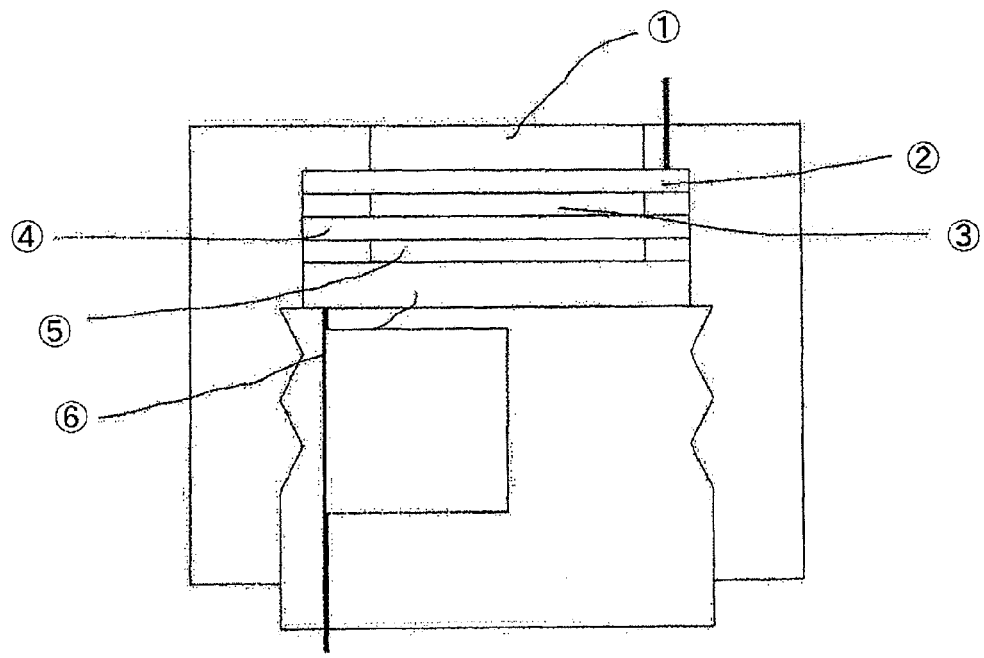
FIG. 3 is a sectional view illustrating a cell for the evaluation of a secondary lithium-air battery.

The electrolyte was allowed to impregnate a polyethylene separator (2 mm thick) and the separator was interposed between the anode catalyst and the cathode catalyst. The assembly was sandwiched between a PTFE container having a 10 mm diameter hole on the air electrode side, and a solid container on the anode side, resulting in an evaluation cell as illustrated in FIG. 3.

Backups were made so that any leakage during the evaluation experiment would be compensated.

3. Evaluation of Catalytic Performance

The cell manufactured above had an open circuit voltage of 3.0 V. The cell was discharged at a discharge current density of 0.2 $mA/cm^2$ for 2 hours using a charge/discharge device manufactured by HOKUTO DENKO CORPORATION (thereby air was reacted with the Li ions to give lithium oxide, producing electricity).

Subsequently, the cell was charged at a current of 0.2 $mA/cm^2$ to a voltage of 4.5 V. (The reaction proceeded in the reverse direction where the lithium oxide was reduced to produce oxygen.)

The cell was again discharged for 2 hours at the same current as that in the first discharge, and was recharged to a voltage of 4.5 V under the same conditions.

The cell life was assumed to last until the quantity of charged electricity dropped to less than half the quantity of electricity in the first discharge. The cell was discharged and recharged repeatedly until the cell life was reached. In other words, the life was determined to end when the percentage of the quantity of recharged electricity was below 50% relative to the quantity of electricity in the first discharge.

The cell life was reached in the 136th cycle. The percentage of the quantity of charged electricity relative to the quantity of discharged electricity was 97% in the first cycle, 98% in the second cycle and approximately 100% in the third and later cycles. The percentage started to decrease in the 102nd cycle, and was 85% in the 120th cycle, 76% in the 130th cycle, 51% in the 136th cycle and 47% in the 137th cycle.

Example 2

1. Preparation of Catalyst

Niobium (IV) oxide (NbO$_2$) weighing 4.95 g (39.6 mmol), tin (IV) oxide (SnO$_2$) weighing 60 mg (0.4 mmol) and carbon (Vulcan 72 manufactured by Cabot Corporation) weighing 1.2 g (100 mmol) were sufficiently crushed and mixed together. The resultant powder mixture was heat treated in a tubular furnace in a nitrogen atmosphere at 1400° C. for 3 hours to give 4.23 g of carbonitride (2) containing tin (0.01 mol per mol of niobium) and niobium.

The carbonitride (2) in an amount of 1.02 g was heat treated in a rotary tubular furnace at 800° C. for 1 hour while passing an argon gas containing 1% by volume of oxygen gas and 2% by volume of hydrogen gas. As a result, 1.10 g of oxycarbonitride containing tin (1 mol %) and niobium (hereinafter, also referred to as the catalyst (2)) was obtained. The results of the elemental analysis of the catalyst (2) are described in Table 1.

Figure 4:
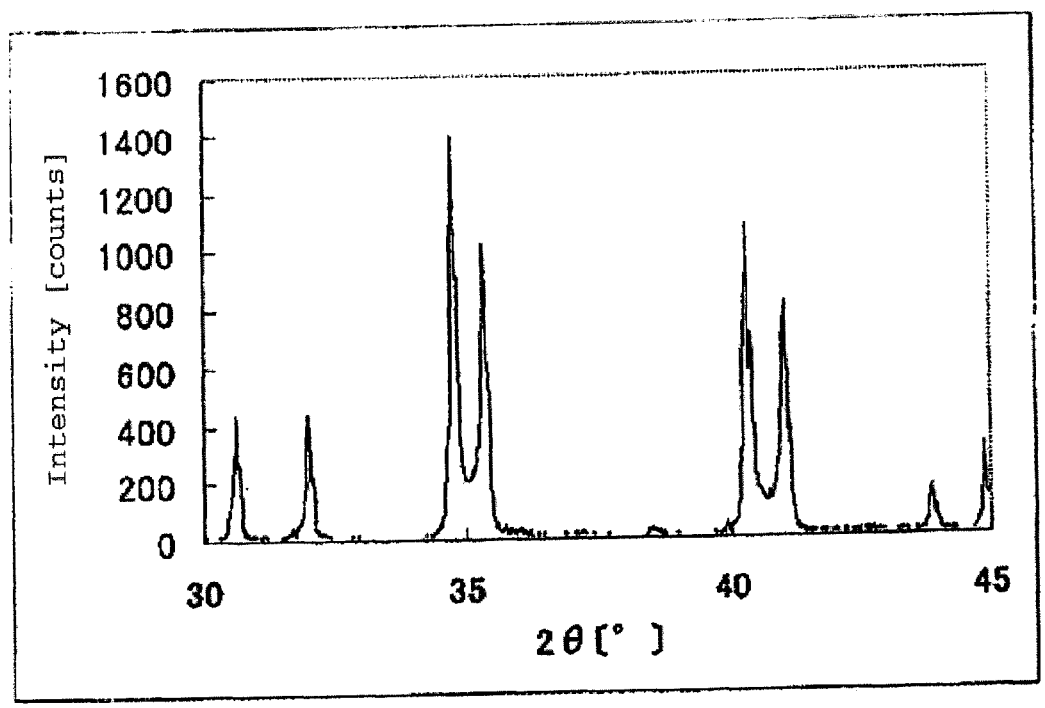
FIG. 4 is an X-ray powder diffraction spectrum of a catalyst in Example 2.

FIG. 4 shows an X-ray powder diffraction spectrum of the catalyst (2). Four diffraction peaks were observed at diffraction angles 2θ of 33° to 43°.

The elemental analysis of the catalyst provided the following molar ratio.

Nb:Sn:C:N:O=1:0.01:0.2:0.05:2.38

2. Production of Secondary Air Battery Sample

The procedures in Example 1 were repeated, except that the catalyst (1) was replaced by the catalyst (2).

3. Evaluation of Catalytic Performance

The secondary air battery sample was evaluated by the experiment as described in Example 1. The cell life was reached in the 128th cycle. The percentage of the quantity of charged electricity relative to the quantity of discharged electricity was 96% in the first cycle, 98% in the second cycle, 99% in the third cycle, and approximately 100% in the fourth and later cycles. The percentage started to decrease in the 98th cycle, and was 95% in the 100th cycle, 86% in the 110th cycle, 71% in the 120th cycle and 50% in the 128th cycle.

Example 3

1. Preparation of Catalyst

Niobium carbide weighing 5.88 g (56 mmol), ferric oxide weighing 0.40 g (2.5 mmol) and niobium nitride weighing 5.14 g (48 mmol) were sufficiently crushed and mixed together. The resultant powder mixture was heat treated in a tubular furnace in a nitrogen atmosphere at 1600° C. for 3 hours to give 11.19 g of carbonitride (3) containing iron and niobium. The sintered carbonitride (3) was crushed in a ball mill.

The carbonitride (3) in an amount of 1.00 g was heat treated in a tubular furnace at 900° C. for 6 hours while passing a nitrogen gas containing 1% by volume of oxygen gas and 0.8% by volume of hydrogen gas. As a result, 1.24 g of oxycarbonitride containing iron (0.02 mol per mol of niobium) and niobium (hereinafter, also referred to as the catalyst (3)) was obtained.

Figure 5:
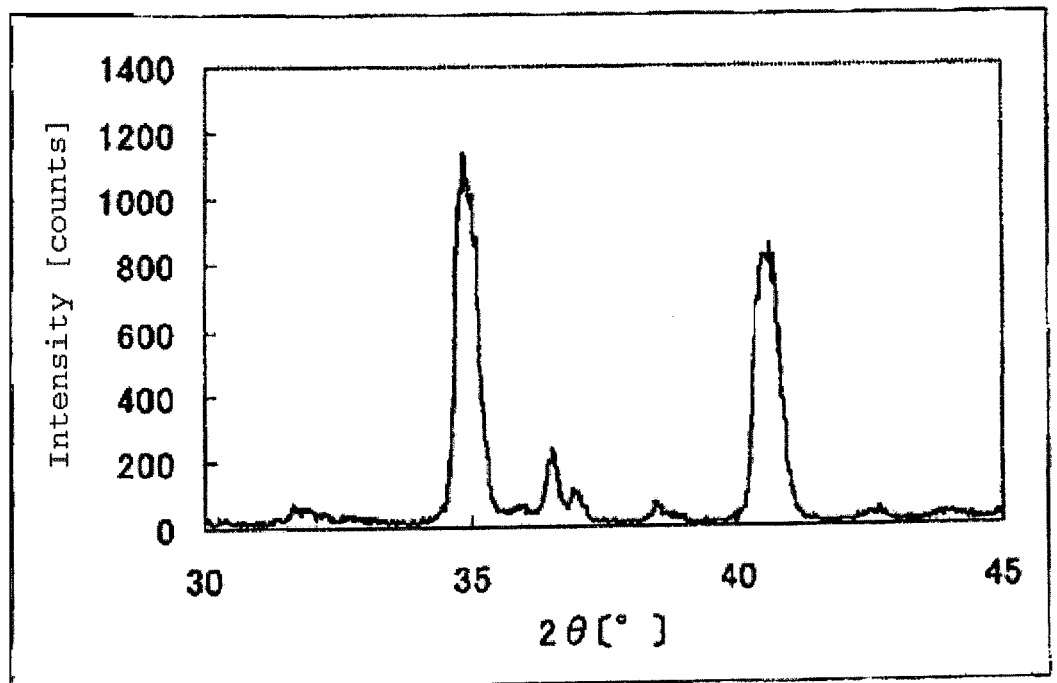
FIG. 5 is an X-ray powder diffraction spectrum of a catalyst in Example 3.

FIG. 5 shows an X-ray powder diffraction spectrum of the catalyst (3). Four diffraction peaks were observed at diffraction angles 2θ of 33° to 43°.

The elemental analysis of the catalyst provided the following molar ratio.

Nb:Fe:C:N:O=1:0.02:0.30:0.01:2.27

2. Production of Secondary Air Battery Sample

The procedures in Example 1 were repeated, except that the catalyst (1) was replaced by the catalyst (3).

3. Evaluation of Catalytic Performance

The secondary air battery sample was evaluated by the experiment as described in Example 1. The cell life was reached in the 178th cycle. The percentage of the quantity of charged electricity relative to the quantity of discharged electricity was 97% in the first cycle, 98% in the second cycle, 99% in the third cycle, and approximately 100% in the fourth and later cycles. The percentage started to decrease in the 160th cycle, and was 95% in the 170th cycle, 85% in the 175th cycle, 70% in the 178th cycle and 49% in the 179th cycle.

Example 4

1. Preparation of Catalyst

Niobium (IV) oxide (NbO$_2$) weighing 4.75 g (38 mmol), tin (IV) oxide (SnO$_2$) weighing 302 mg (2 mmol) and carbon (Vulcan 72 manufactured by Cabot Corporation) weighing 1.2 g (100 mmol) were sufficiently crushed and mixed together. The resultant powder mixture was heat treated in a tubular furnace in a nitrogen atmosphere at 1400° C. for 3 hours to give 4.10 g of carbonitride (4) containing tin (5 mol %) and niobium.

The carbonitride (4) in an amount of 1.02 g was heat treated in a tubular furnace at 800° C. for 1 hour while passing an argon gas containing 1% by volume of oxygen gas. As a result, 1.09 g of oxycarbonitride containing tin (0.05 mol per mol of niobium) and niobium (hereinafter, also referred to as the catalyst (4)) was obtained.

Figure 6:
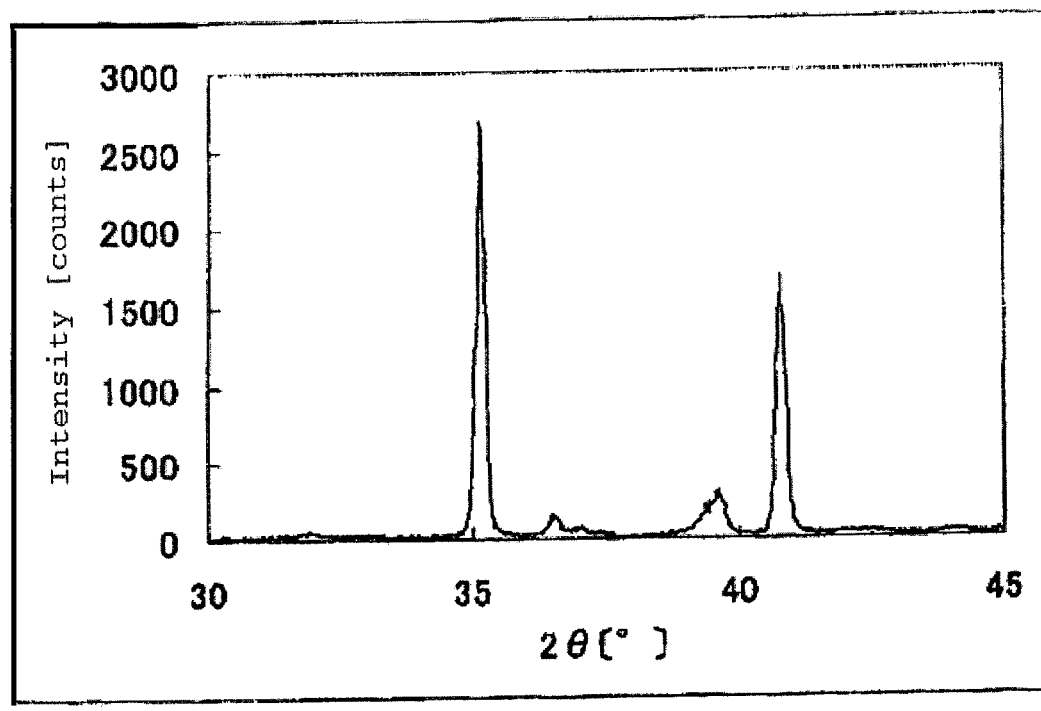
FIG. 6 is an X-ray powder diffraction spectrum of a catalyst in Example 4.

FIG. 6 shows an X-ray powder diffraction spectrum of the catalyst (4). Four diffraction peaks were observed at diffraction angles 2θ of 33° to 43°.

The elemental analysis of the catalyst provided the following molar ratio.

Nb:Sn:C:N:O=1:0.05:0.4:0.02:2.15

2. Production of Secondary Air Battery Sample

The procedures in Example 1 were repeated, except that the catalyst (1) was replaced by the catalyst (4).

3. Evaluation of Catalytic Performance

The secondary air battery sample was evaluated by the experiment as described in Example 1. The cell life was reached in the 128th cycle. The percentage of the quantity of charged electricity relative to the quantity of discharged electricity was 95% in the first cycle, 96% in the second cycle, 98% in the third cycle, and approximately 100% in the fourth and later cycles. The percentage started to decrease in the 115th cycle, and was 95% in the 117th cycle, 92% in the 120th cycle, 83% in the 125th cycle, 62% in the 128th cycle, and 45% in the 129th cycle.

Example 5

1. Preparation of Catalyst

Titanium carbide (TiC) weighing 5.10 g (85 mmol), titanium oxide (TiO$_2$) weighing 0.80 g (10 mmol) and titanium nitride (TiN) weighing 0.31 g (5 mmol) were sufficiently mixed together. The mixture was heated in a nitrogen atmosphere at 1800° C. for 3 hours to give 5.73 g of titanium carbonitride. Since the compound had been sintered, it was crushed in an automatic mortar grinder.

Figure 7:
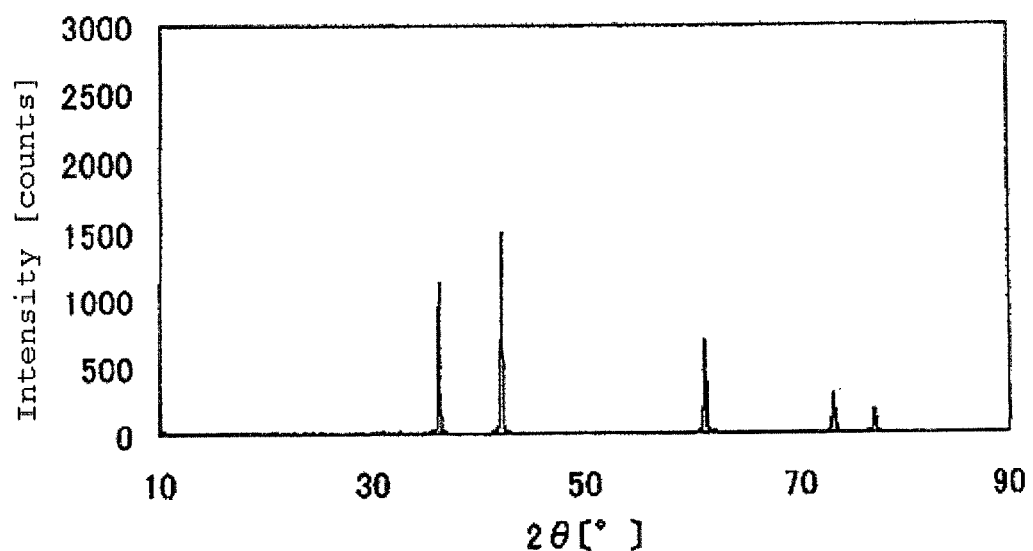
FIG. 7 is an X-ray powder diffraction spectrum of TiCN in Example 5.

FIG. 7 shows an X-ray powder diffraction spectrum of the titanium carbonitride.

The titanium carbonitride in an amount of 298 mg was heated in a tubular furnace at 1000° C. for 10 hours while passing a nitrogen gas containing 1% by volume of oxygen gas and 4% by volume of hydrogen gas. As a result, 393 mg of titanium oxycarbonitride (hereinafter, also referred to as the catalyst (5)) was obtained.

Figure 8:
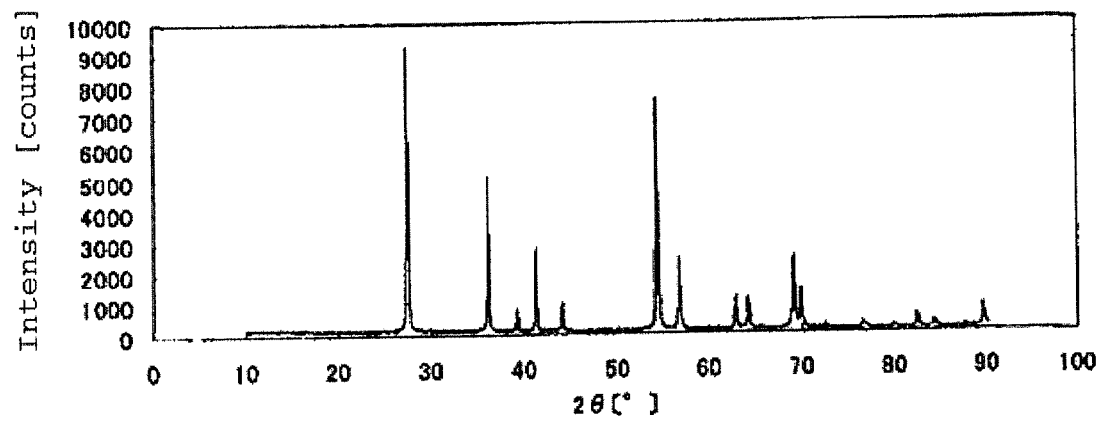
FIG. 8 is an X-ray powder diffraction spectrum of a catalyst in Example 5.

FIG. 8 shows an X-ray powder diffraction spectrum of the catalyst (5).

The elemental analysis of the catalyst provided the following molar ratio.

Ti:C:N:O=1:0.18:0.06:1.52

2. Production of Secondary Air Battery Sample

The procedures in Example 1 were repeated, except that the catalyst (1) was replaced by the catalyst (5).

3. Evaluation of Catalytic Performance

The secondary air battery sample was evaluated by the experiment as described in Example 1. The cell life was reached in the 165th cycle. The percentage of the quantity of charged electricity relative to the quantity of discharged electricity was 97% in the first cycle, 99% in the second cycle, and approximately 100% in the third and later cycles. The percentage started to decrease gradually in the 150th cycle, and was 95% in the 155th cycle, 92% in the 160th cycle, 85% in the 163rd cycle, 64% in the 164th cycle, 57% in the 165th cycle, and 43% in the 166th cycle.

Example 6

1. Preparation of Catalyst

Figure 9:
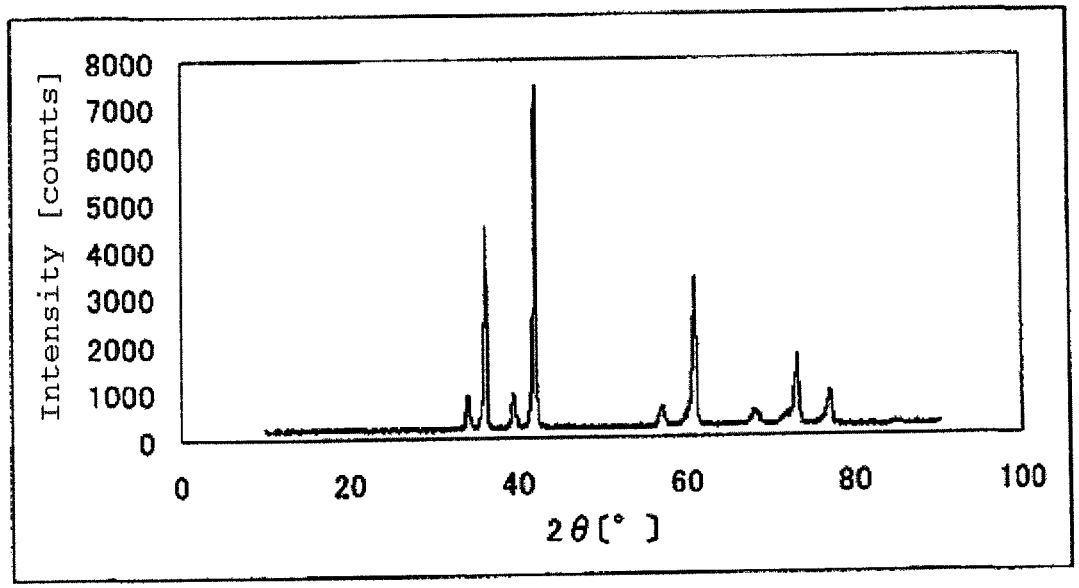
FIG. 9 is an X-ray powder diffraction spectrum of TiZrCN in Example 6.

Titanium (IV) oxide ($TiO_2$) weighing 2.87 g (39.6 mmol), zirconium oxide ($ZrO_2$) weighing 0.49 g (4 mmol) and carbon (Vulcan 72 manufactured by Cabot Corporation) weighing 1.2 g (100 mmol) were sufficiently crushed and mixed together. The resultant powder mixture was heat treated in a tubular furnace in a nitrogen atmosphere at 1800° C. for 3 hours to give 3.05 g of carbonitride (6) containing zirconium (0.09 mol per mol of titanium) and titanium. FIG. 9 shows an X-ray powder diffraction spectrum of the carbonitride (6).

Figure 10:
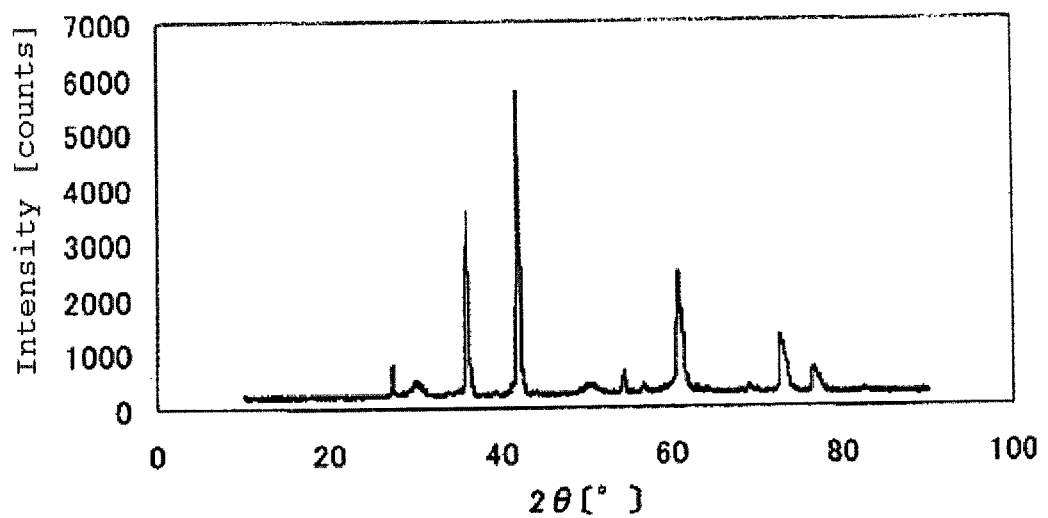
FIG. 10 is an X-ray powder diffraction spectrum of a catalyst in Example 6.

The carbonitride (6) in an amount of 1.02 g was heat treated in a tubular furnace at 1000° C. for 1 hour while passing an argon gas containing 1% by volume of oxygen gas. As a result, 1.10 g of oxycarbonitride containing zirconium (1 mol %) and titanium (hereinafter, also referred to as the catalyst (6)) was obtained. FIG. 10 shows an X-ray powder diffraction spectrum of the catalyst (6).

The elemental analysis of the catalyst provided the following molar ratio.

Ti:Zr:C:N:O=1:0.09:0.23:0.07:1.43

2. Production of Secondary Air Battery Sample

The procedures in Example 1 were repeated, except that the catalyst (1) was replaced by the catalyst (6).

3. Evaluation of Catalytic Performance

The secondary air battery sample was evaluated by the experiment as described in Example 1. The cell life was reached in the 185th cycle. The percentage of the quantity of charged electricity relative to the quantity of discharged electricity was 96% in the first cycle, 99% in the second cycle, and approximately 100% in the third and later cycles. The percentage started to decrease gradually in the 170th cycle, and was 96% in the 175th cycle, 92% in the 178th cycle, 88% in the 180th cycle, 74% in the 183rd cycle, 65% in the 184th cycle, 55% in the 185th cycle, and 48% in the 186th cycle.

Example 7

1. Preparation of Catalyst

A catalyst was prepared in the same manner as described in Example 1.

2. Production of Air Electrode Sample

The catalyst was weighed in an amount of 30 mg and was mixed with 1.5 mg of crushed KETJENBLACK EC300J (manufactured by Lion Corporation). A 25 mg portion of the mixture was combined with 1.25 mL of a 1:1 (by volume) mixture of isopropanol:distilled water. The resultant mixture was mixed in an ultrasonic bath.

A carbon rod (diameter 5.8 mm, length 30 mm) was provided which had been thoroughly polished. The ultrasonically stirred mixture was dropped with a micropipette, each in several 1 μL, onto one end surface of the carbon rod and was dried at 120° C. This procedure was repeated until the catalyst applied on the rod surface and the carbon weighed 20 mg. The rod side surface was coated with a manicure-type insulating resin. The rod was connected with a gold wire for the collection of electric current. Thus, a working electrode was prepared.

3. Evaluation of Performance of Air Electrode

A platinum black wire was used as the counter electrode, and a normal hydrogen electrode (NHE) as the reference electrode. The electrolyte was a 1N aqueous KOH solution. They were placed into a 5 mL-volume, four-necked glass flask. The temperature in the electrolytic cell was set at 30° C. Nitrogen or oxygen was bubbled on the working electrode side, and potential scanning was made to evaluate the performance as an air electrode in the oxygen reduction and the oxygen production. This testing method is suited for determining the catalytic ability as an air electrode catalyst in an aqueous solution battery such as a secondary zinc-air battery. The oxygen reduction ability was evaluated based on the current difference that was obtained by subtracting a current-potential curve recorded by potential scanning while bubbling the working electrode with nitrogen, from a current-potential curve recorded by potential scanning while bubbling the working electrode with oxygen. FIGS. 11 to 16 illustrate "oxygen polarization curve minus nitrogen polarization curve".

4. Evaluation Results

Figure 11:
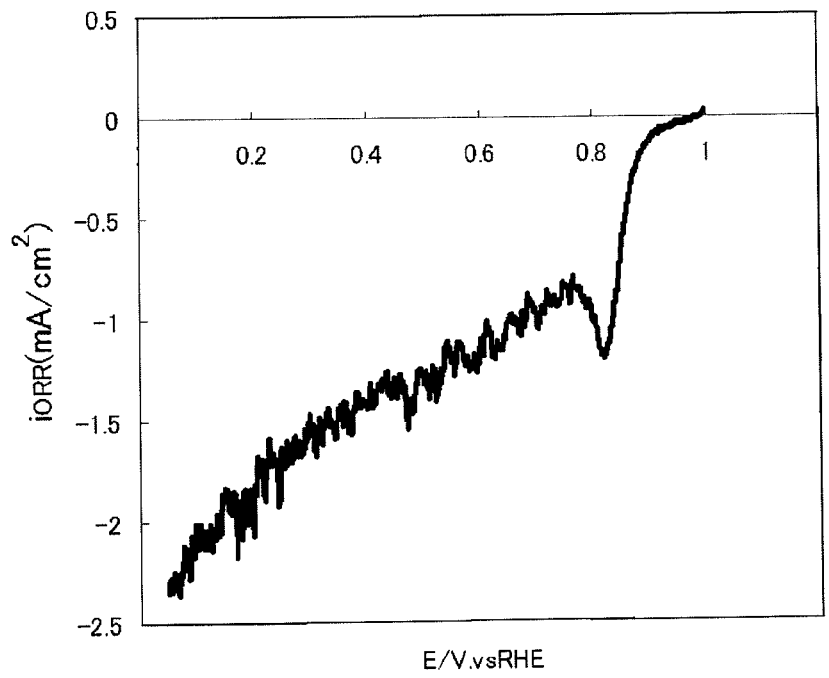
FIG. 11 is a current-potential curve showing the oxygen reduction ability in Example 7.

FIG. 11 shows a current-potential curve recorded by potential scanning from 1.2 V (vs. NHE) toward the oxygen reduction side. The oxygen reduction onset potential was high (0.97 V), and a large reduction current flowed.

Example 8

1. Preparation of Catalyst

A catalyst was prepared in the same manner as described in Example 5.

2. Production of Air Electrode Sample

An evaluation electrode was produced in the same manner as in Example 7, except that the catalyst was changed.

3. Evaluation of Performance of Air Electrode

Evaluation was made in the same manner as in Example 7, except that the working electrode was changed.

4. Evaluation Results

Figure 12:
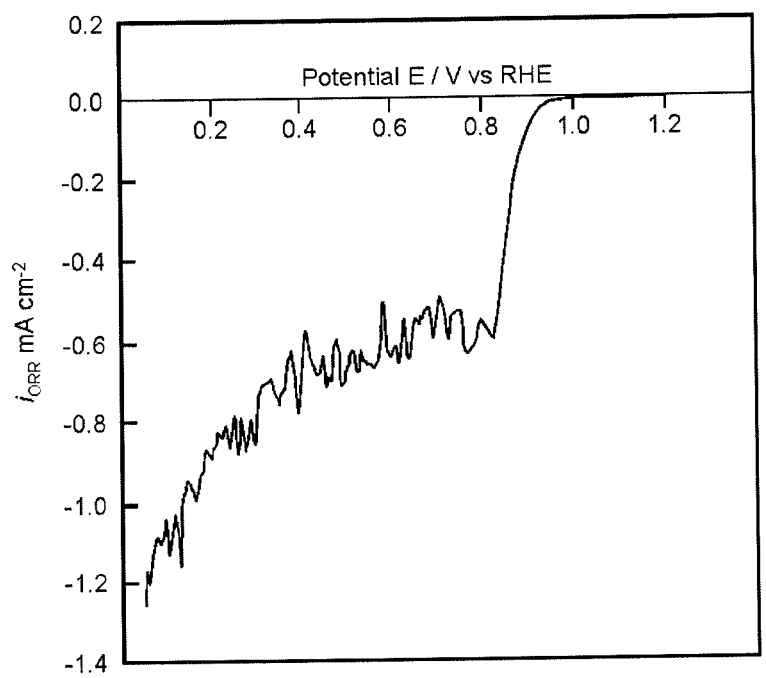
FIG. 12 is a current-potential curve showing the oxygen reduction ability in Example 8.

FIG. 12 shows a current-potential curve recorded by potential scanning from 1.2 V (vs. NHE) toward the oxygen reduction side. The oxygen reduction onset potential was high (0.95 V), and an appropriate reduction current flowed.

Comparative Example 1

1. Preparation of Catalyst

A catalyst was prepared by sufficiently crushing commercial electrolytic manganese dioxide (manufactured by KOJUNDO CHEMICAL LABORATORY CO., LTD.) in a mortar.

2. Production of Air Electrode Sample

An evaluation electrode was produced in the same manner as in Example 7, except that the catalyst was changed.

3. Evaluation of Performance of Air Electrode

Evaluation was made in the same manner as in Example 7, except that the working electrode was changed.

4. Evaluation Results

Figure 13:
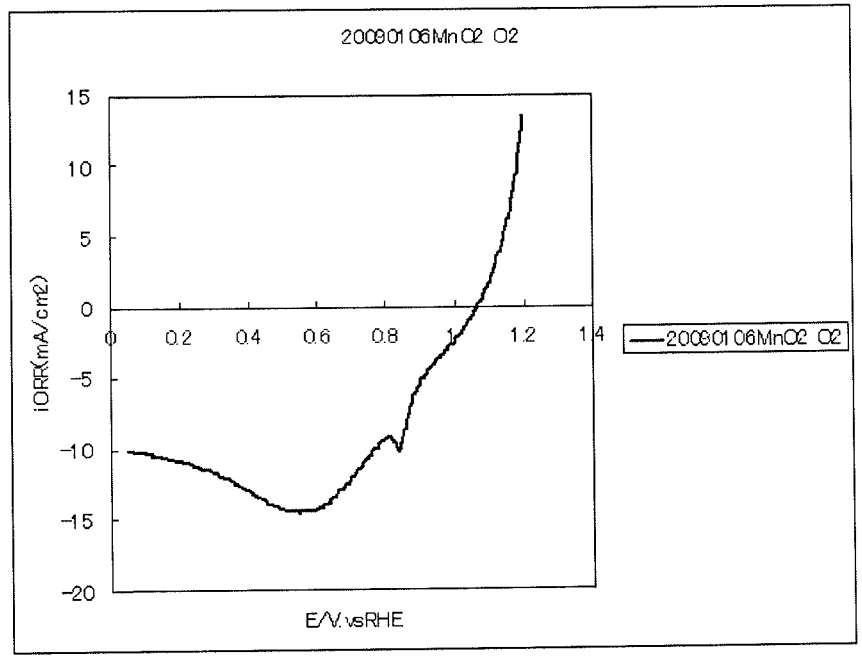
FIG. 13 is a current-potential curve showing the oxygen reduction ability in oxygen in Comparative Example 1.
Figure 14:
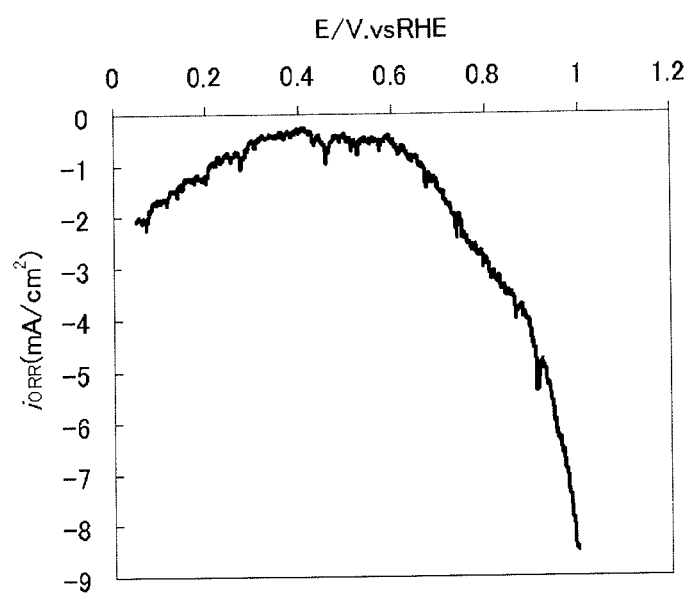
FIG. 14 is a current-potential curve showing the oxygen reduction ability in Comparative Example 1.
Figures 2, 14:
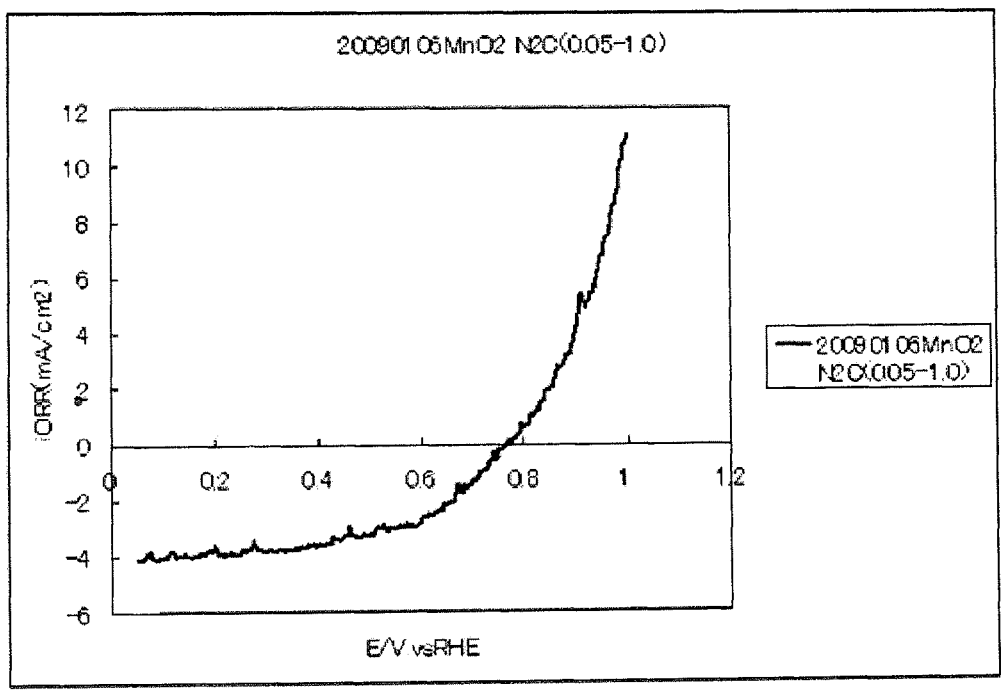

FIG. 13 shows a current-potential curve recorded by potential scanning toward the oxygen reduction side in oxygen. FIG. 14 shows a current curve that was obtained by subtracting a curve recorded by potential scanning in nitrogen from the curve recorded by potential scanning in oxygen. As illustrated, $MnO_2$ was found to have reacted on the oxygen reduction side both in oxygen and in nitrogen, failing to demonstrate good oxygen reduction ability.

The data in nitrogen is illustrated in FIG. 14-2. The data in nitrogen (FIG. 14-2) and the data in oxygen (FIG. 13) show that water was oxidized and an oxidation current started to flow at a potential lower than the potential for oxidation current, 1.23 V. That is, $MnO_2$ was dissolved by the oxidation and was shown to be unsuited in electrodes.

Comparative Example 2

Figure 15:
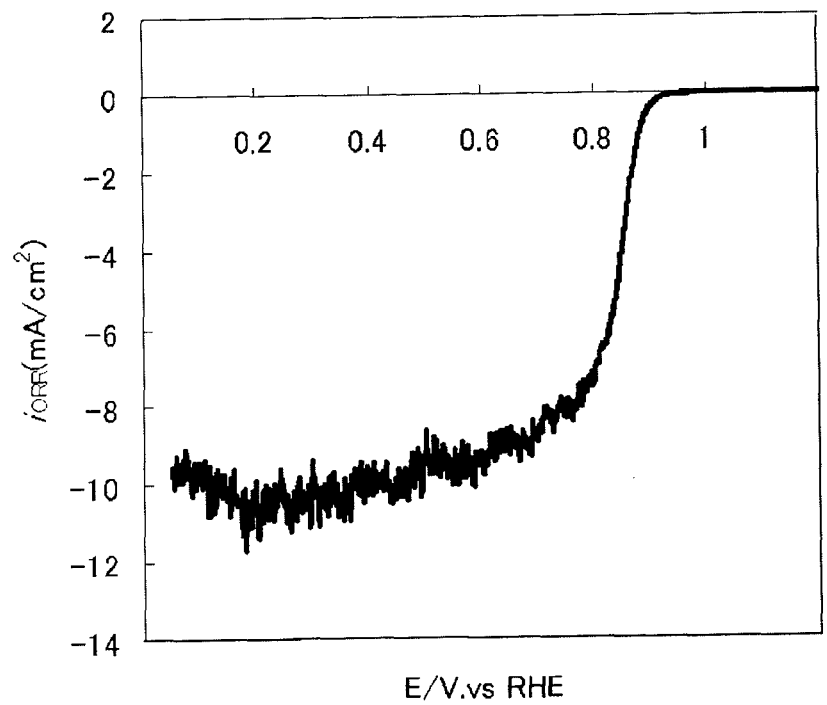
FIG. 15 is a current-potential curve showing the oxygen reduction ability in Comparative Example 2.
Figure 17:
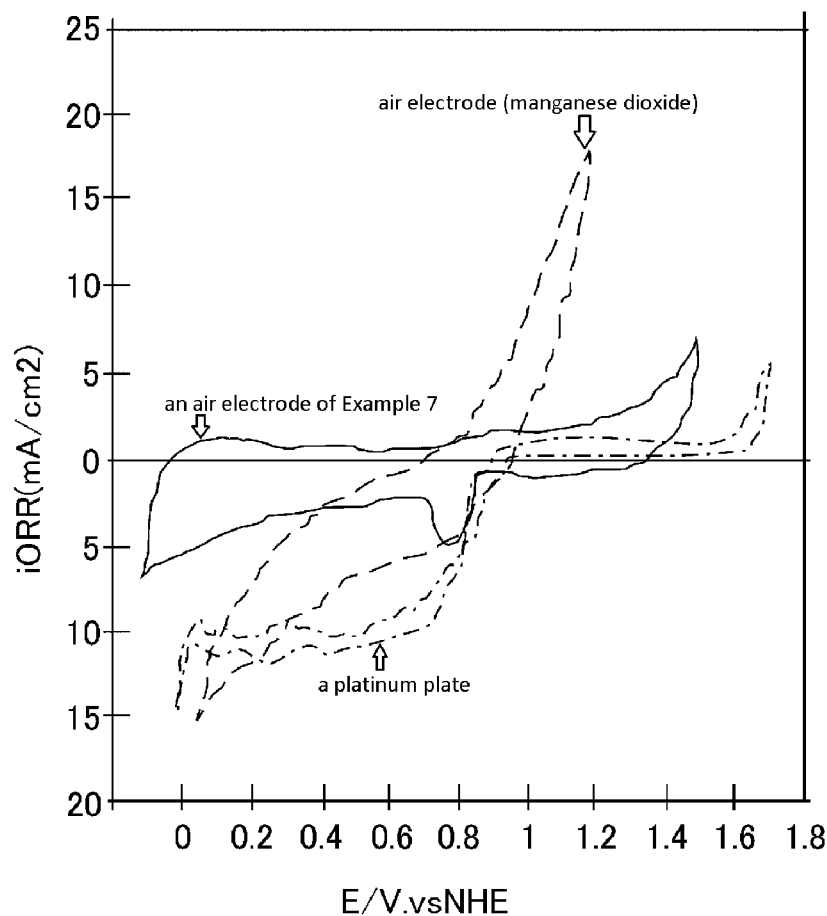
FIG. 17 shows current-potential curves of three electrodes in Example 9.
Figures 1, 17:
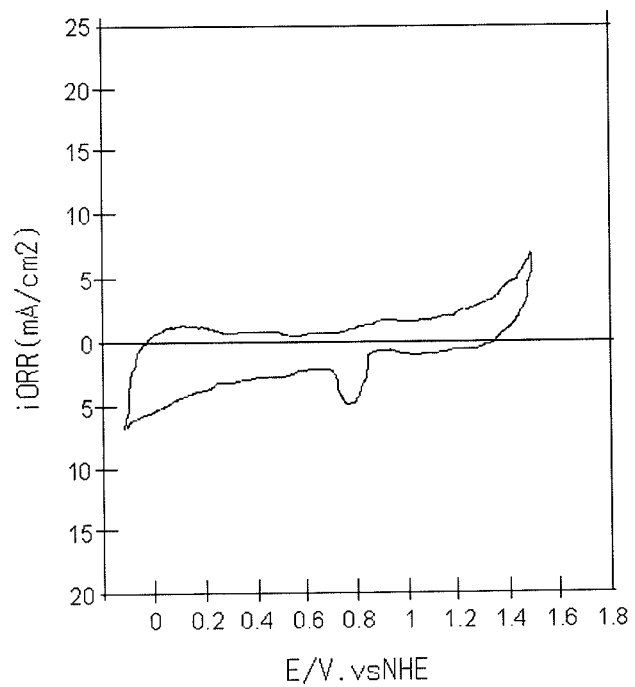
Figures 2, 17:
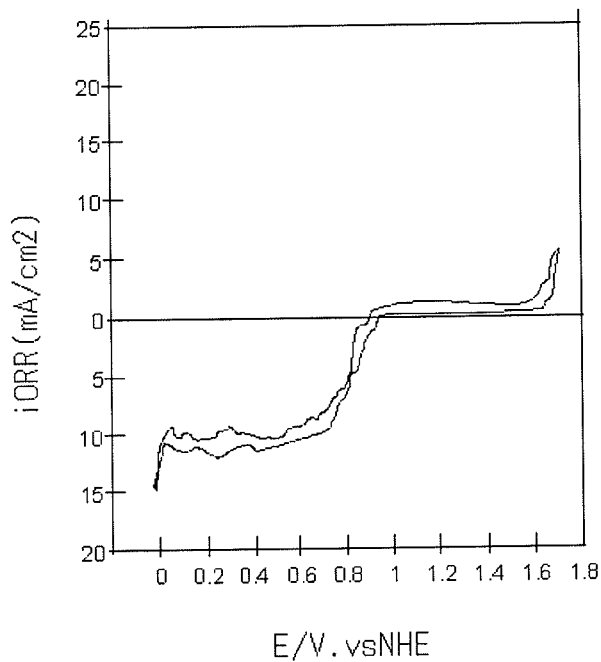
Figures 3, 17:
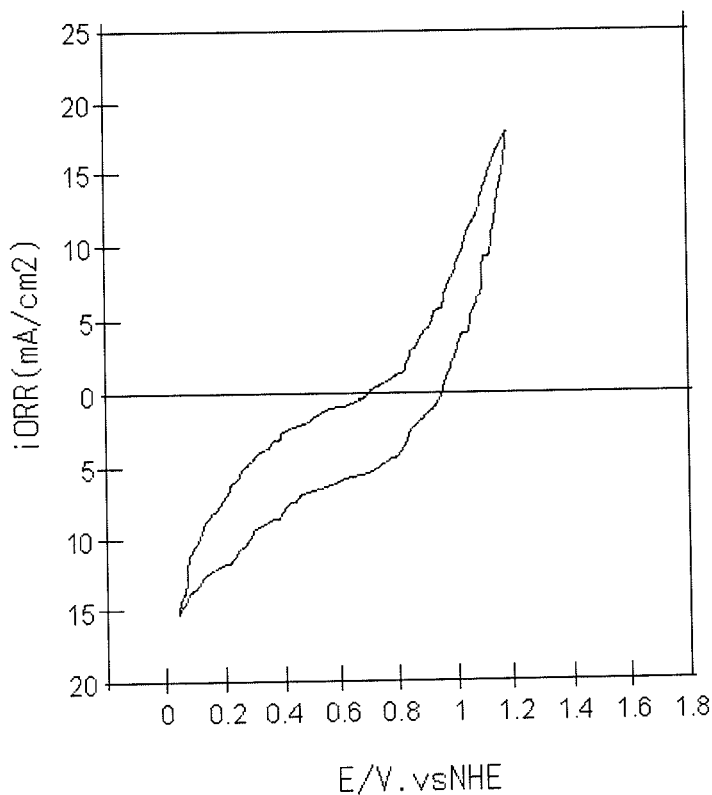

A 2 $cm^2$ platinum plate as an air electrode was evaluated in the same manner as in Example 7, the results being shown in FIG. 15. Good oxygen reduction ability was obtained (0.98 V). However, as illustrated in FIG. 17-2, the overvoltage for the oxygen production was high. The use of such air electrodes is not suited for energy saving.

Comparative Example 3

Figure 16:
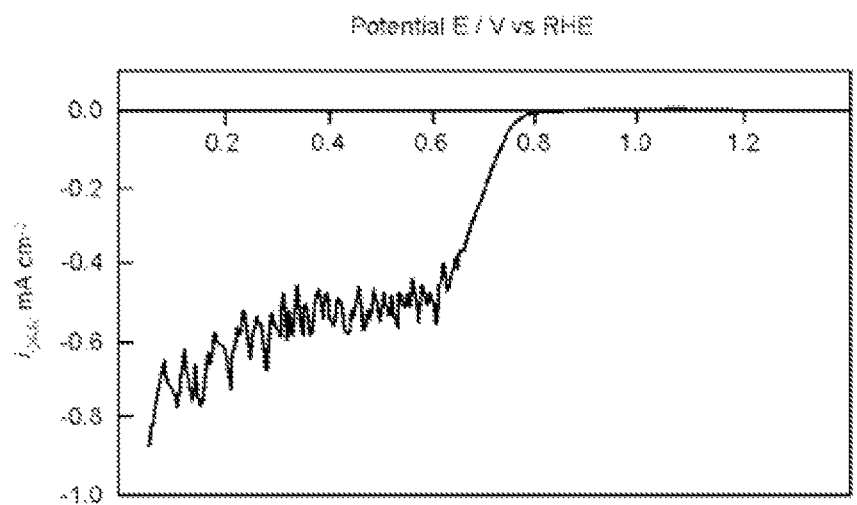
FIG. 16 is a current-potential curve showing the oxygen reduction ability in Comparative Example 3.

The specular carbon rod used in Example 7 was evaluated as an air electrode in the same manner as described in Example 7, the results being shown in FIG. 16. The electrode showed an oxygen reduction ability. However, the overvoltage was high and the oxygen reduction onset potential was 0.80 V (vs. NHE).

Example 9

The air electrodes prepared in Example 7 and Comparative Example 1, and a platinum plate (area: 2 $cm^2$ on each side) were scanned in oxygen, thereby recording current-potential curves showing data from the oxygen reduction to the oxygen production. The results are shown in FIG. 17. The results for the air electrode from Example 7, the platinum plate (area: 2 $cm^2$ on each side) and the air electrode from Comparative Example 1 are individually described in FIGS. 17-1 to 17-3, respectively.

The air electrode from Example 7 had high oxygen reduction ability and low overvoltage for the oxygen production (FIG. 17-1). This result showed that the catalyst used therein was suited for use in a secondary air battery.

The platinum plate showed good oxygen reduction ability, but the overvoltage for the oxygen production was very high (FIG. 17-2).

The air electrode (manganese dioxide) prepared in Comparative Example was shown to be inefficient and unsuited for use in a secondary battery because the manganese dioxide itself reacted both in the oxygen reduction and the oxygen production (FIG. 17-3).

Example 10

Figure 18:
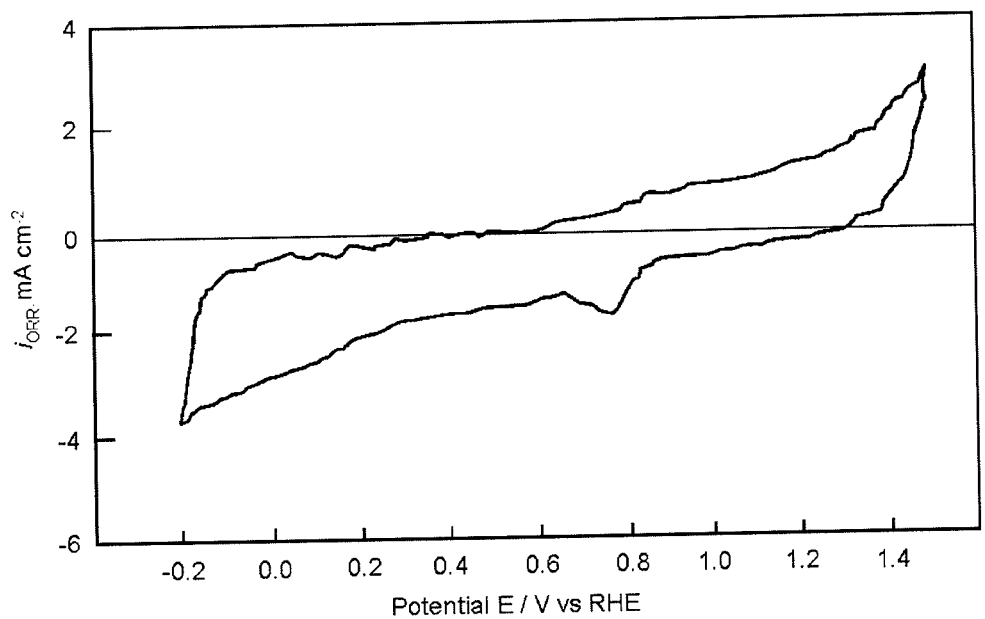
FIG. 18 is a current-potential curve of an electrode in Example 10.

The electrode from Example 8 was scanned in oxygen similarly to Example 9, the results being shown in FIG. 18. The electrode had high oxygen reduction ability and low overvoltage for the oxygen production. This result showed that the catalyst was suited for use in a secondary air battery.

INDUSTRIAL APPLICABILITY

The catalysts according to the invention have high oxygen reduction ability and lower the overvoltage for the oxygen production in recharging. Thus, the catalysts are suitably used as secondary metal-air battery catalysts.

REFERENCE SIGNS LIST

1: AIR HOLE
2: AIR ELECTRODE COLLECTOR
3: AIR ELECTRODE CATALYST
4: SEPARATOR
5: Li ANODE
6: Li ELECTRODE COLLECTOR

The invention claimed is:
1. An air battery catalyst comprising an oxycarbonitride of a Group IV transition metal,
wherein the metal oxycarbonitride has a compositional formula represented by $Ti_aM_bC_xN_yO_z$ (wherein a, b, x, y and z represent a ratio of the numbers of the atoms,

$0.01 \leq a < 1.0$, $0 < b \leq 0.99$, $a+b=1$, $0.05 \leq x \leq 0.7$, $0.01 \leq y \leq 0.7$, $0.1 \leq z \leq 1.94$, $1.0 \leq x+y+z \geq 3.1$, and $2.0 \geq 4x+3y+2z$, and M is at least one metal selected from the group consisting of tin, indium, platinum, copper, iron, chromium, molybdenum, tungsten, hafnium, cobalt, manganese, cerium, nickel, yttrium, lanthanum, samarium, calcium, barium and magnesium).

2. The air battery catalyst according to claim 1, wherein the air battery catalyst is used in combination with an air battery anode comprising lithium, aluminum, magnesium, calcium, zinc, an alloy of any of these metals with another metal, or any of these metals that is intercalated in carbon.

3. A secondary air battery comprising the catalyst described in claim 1.

* * * * *